United States Patent [19]

Suquet

[11] 4,098,237
[45] Jul. 4, 1978

[54] INTERNAL COMBUSTION ENGINE

[76] Inventor: Jaime Suquet, c/o George Spector, 3615 Woolworth Bldg., 233 Broadway, New York, N.Y. 10007

[21] Appl. No.: 604,907

[22] Filed: Aug. 15, 1975

[30] Foreign Application Priority Data

Aug. 18, 1974 [AR] Argentina ................ 255337

[51] Int. Cl.² .......................................... F02D 39/02
[52] U.S. Cl. ................................. 123/75 C; 123/75 B
[58] Field of Search ................ 123/75 B, 75 C, 79 R

[56] References Cited

U.S. PATENT DOCUMENTS

| 1,206,520 | 11/1916 | Eglinton | 123/75 C |
| 1,293,508 | 2/1919 | Moore | 123/75 C |
| 1,323,445 | 12/1919 | Boyce | 123/79 R |
| 1,812,063 | 6/1931 | Spencer | 123/75 B |
| 2,215,579 | 9/1940 | Eichelberg | 123/79 R |
| 2,742,028 | 4/1956 | Robinson | 123/79 R |
| 2,807,250 | 9/1957 | Mallory | 123/75 B |

FOREIGN PATENT DOCUMENTS

| 182,008 | 5/1955 | Austria | 123/75 C |
| 72,243 | 8/1916 | Switzerland | 123/75 C |

Primary Examiner—Charles J. Myhre
Assistant Examiner—David D. Reynolds

[57] ABSTRACT

A 4-stroke internal combustion engine having an orifice through the cylinder wall just above lower dead center point, said orifice being sealed by the piston rings when the piston moves upward.

1 Claim, 10 Drawing Figures

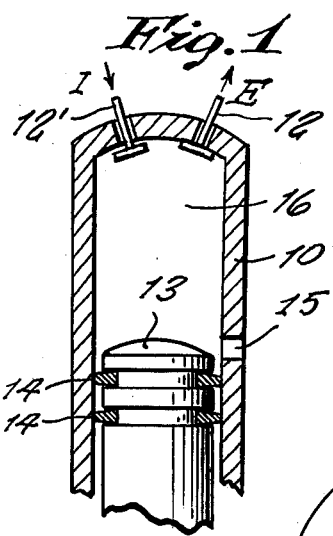
Fig.1
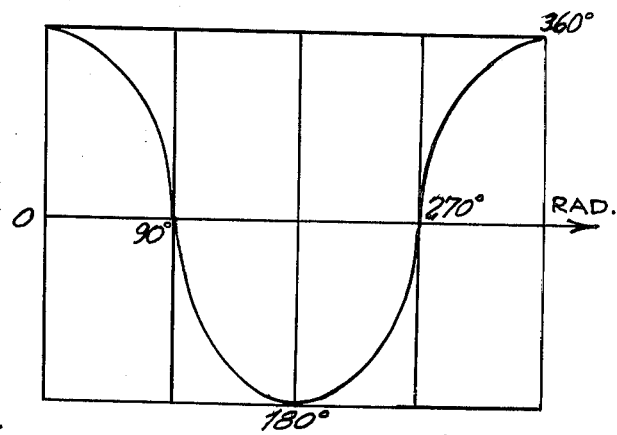
Fig.3
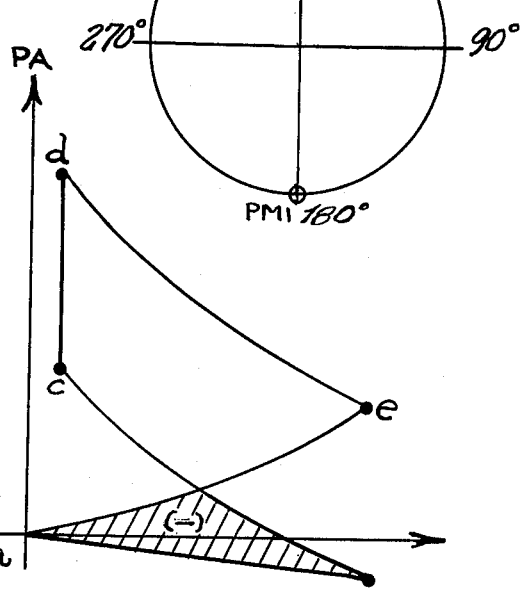
Fig.2
Fig.4
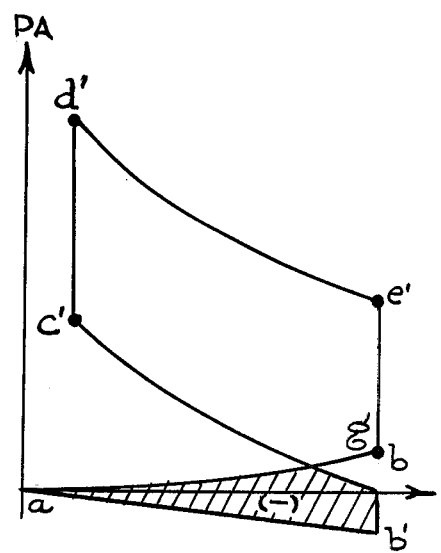
Fig.5
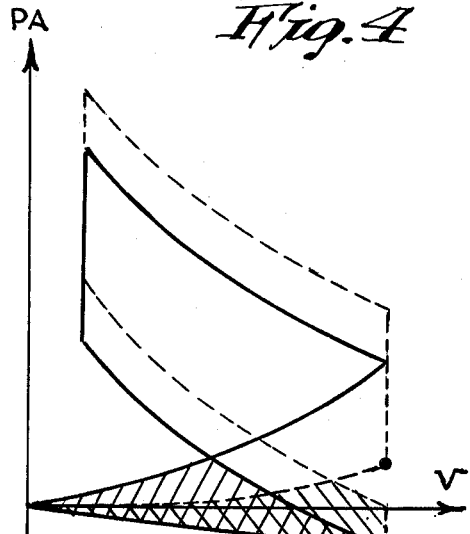
Fig.6
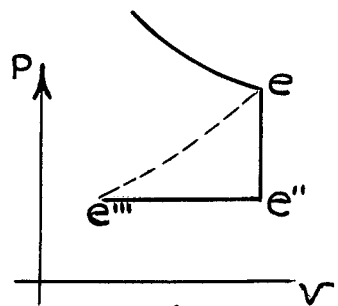
Fig.7

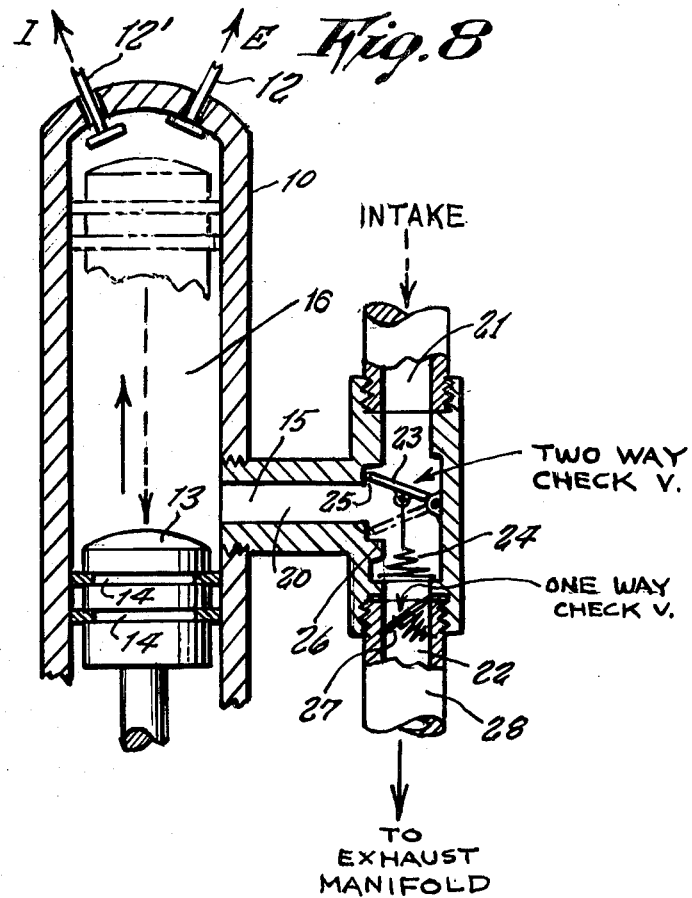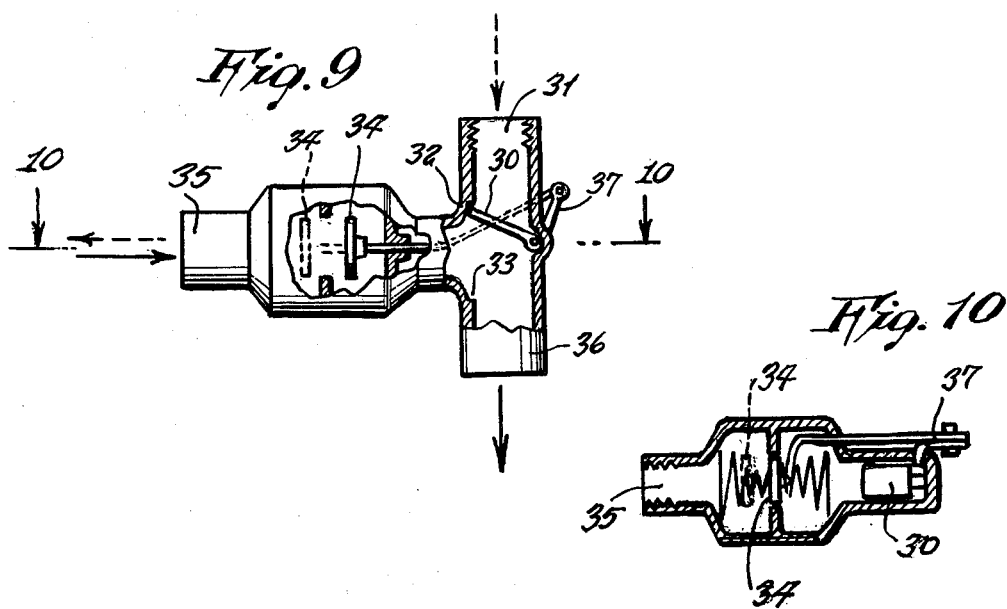

INTERNAL COMBUSTION ENGINE

The main object of this invention is to improve the efficiency and therefore the consumption of internal combustion engines, exclusively 4-stroke engines.

More particularly, the object of this invention is to change the Carnot's cycle of these engines, improving the efficiency thereof and relieving the mainshaft bearings, reducing the connecting rod and other mechanical members stresses, reducing the cubic capacity of the cylinders, and in consequence the weight of said engines, in accordance with the experiments that have been performed, from 20 to 25%.

The above mentioned improvements are characterized in that at the wall of each cylinder of a 4-stroke engine an orifice is arranged in communication with the outside, said orifice being located adjacent to the lower dead point of each respective cylinder.

The limitations that forcibly should be introduced in the Carnot's cycle of any internal combustion engine are well known. These limitations are due to several efficiency losses, originating when shifting from an ideal cycle to a real cycle.

Among these various losses we are only interested in this case in the losses due to the engine proper.

These losses may be called "pumping" or admission losses and "distribution or exhaust adjustment losses." In FIG. 4 of the accompanying drawing an ideal Carnot's cycle may be seen with these losses included for a generic and well known 4-stroke engine with no other provisions such as heat dissipation, the need of advancing the ignition, etc., In FIG. 4, we see that the suction or admission stroke, e.g. upper dead point (U.D.P.) is started at $a$ originating a depression up to $b$, said depression being produced by the piston suctioning a fresh mixture while going down to the lower dead point. This point $b$ remains below atmospheric pressure with the consequent increase of effort on the part of the piston to overcome it, this depression action as a brake on the piston.

It is well known that in no internal combustion engine the filling is perfect in the admission stroke. Normally, about 80% is obtained. With this invention a filling of 95 to 98% may be secured.

This result being given, it is obvious to emphasize the advantages secured in all aspects, and as above mentioned, the power is increased in the same ratio.

From $b$ to $c$ is shown the polytropic compression process; $c$, $d$ is the ideal combustion and $d$, $e$ is the expansion. We are thus interested to see that $a$ $e$ F, $f$ coincident with $a$, the exhaust occurs, and that all times $e$, $f$ remains above atmospheric pressure thus precluding a complete emptying of the cylinder and remaining a residual volume which is harmful because the gas sweeping must always be effected against a positive pressure, even when the exhaust valve is open.

A further loss clearly introduced by the engine is the so called "loss by distribution adjustment." In fact, when one sees the diagram of FIG. 7, the true ideal cycle (enlarging point $e$) of FIG. 4) should be as follow: at $e$ the cylinder exhaust valve opens and the gasses should be exhausted at constant volume following $e$ $e$ $e''$ i.e. at constant volume but being given that the piston does not stop and is still operating, the true evolution of point $e$ occurs following the line $e$, $e'''$. Through a proper distribution adjustment, it is possible to round off said curve and to so reduce the loss of area, but a certain loss is always present.

We see then in accordance with what has been said above and the teachings of the art that mainly to the engine are due two important deviations from the Carnot's cycle: that so called "pumping losses" and the "distribution adjustment losses." When we remember that the useful work of the cycle is given by the resultant positive area enclosed by the said Carnot's cycle, it will be understood that any area reduction will be equivalent to a loss in efficiency.

It has been found that when at least one orifice is arranged going through the cylinder wall associated to each piston, said orifice communicating the cylinder inside with the external atmosphere and this orifice is located near the cylinder head when it is at its lower dead point, a sensible change in the Carnot's cycle will be obtained, avoiding in part the pumping or admission loss and in part the distribution adjustment loss at the exhaust time with the consequent efficiency increment, fuel economy and less stresses in certain mechanical members.

Based on the above mentioned combination, many embodiments can be materialized, but with the ideal of concretely expressing the advantages that have been outlined, to which the users will add many more and to make easier the understanding of the constructive and functional features of the improvements in internal combustion engines, exclusively 4-stroke engines, of this invention, hereinbelow will be disclosed a preferred example of an embodyment of the invention with reference to the enclosed drawing with the provision that, being as it is an example, it must not be considered as limitative of the scope of the invention but merely it has as its object to explain and illustrate the basic idea of this invention.

In the drawings:

FIG. 1 shows a longitudinal schematic and simplified section of a cylinder and the associated piston in accordance with this invention;

FIGS. 2 and 3 show the well known diagrams showing each piston position according to the mainshaft angle;

FIG. 4 shows an ideal Carnot's cycle with the efficiency losses due to the engine already taken on account;

FIG. 5 shows the same cycle modified in accordance with the effects producted thereon by this invention;

FIG. 6 shows FIGS. 4 and 5 superposed for a better comparison of the changes secured; and FIG. 7 shows the right hand end of the cycle according to FIG. 4.

FIG. 8 is a longitudinal cross-section through a modified form of the invention wherein valves are included to either vent exhaust gases a direct air into the cylinder.

FIG. 9 partly in section shows another modified valve system for effecting desired intake or exhaust from the cylinder.

FIG. 10 is a section through 10—10 of FIG. 9.

In FIG. 1, the schematic longitudinal section of the cylinder and piston of a 4-stroke engine may be seen. The reference number 10 in this figure marks the walls of the cylinder within which is located the piston 13 provided with the piston rings 14 and 14', having the cylinder the valves 12 and 12' at the head. At the side wall 10 of the cylinder — and this is the novelty of this invention — at least one orifice 15 is bored and carefully located adjacent to the lower dead point of the piston 3, said orifice passing through the wall so that it communicates said cylinder chamber 16 with the outside.

This orifice 15, so elemental at first sight, provides nevertheless a marked improvement in the engine efficiency; in fact this orifice provides for the exhaust of gases and the admission of a mass of fresh air practically in a simultaneous way. When the cylinder march is analyzed with the help of FIGS. 2 and 3, one can see that in the first stroke the admission takes place. As it is well known, the admission is partially aided by the vacuum created by the piston while going down, this vacuum being of course at a maximum when the mainshaft rotates 180° from 0°.

At this point (see diagram No. 3) the pistion remains motionless for an infinitesimal time fraction and when the piston 13 opens the orifice 15, a further admission of fresh air mass goes into the inside 16 of the cylinder, said mass modifying the mixture already gasified which has been introduced therein by the known processes. It has been verified through practical experiments performed on 4-stroke engines that this additional mass is equivalent to between 20 and 25% of the cylinder volume, thus causing a pressure differential reduction at the end of the stroke.

The compression of the gas mass plus X is then started, being given that as soon as the additional mass gets inside the cylinder, the piston immediately afterwards closes the orifice 5 blocking the escape of the gas mass plus X.

When the explosion takes place, the piston 13 reaching once more the lower dead point, it opens the orifice producing a quicker more complete exhaust of the burned gasses so that a reduction of the exhaust back-pressure on the piston is effected.

Orifice 5 opens practically at the same time as the exhaust valve E whereby an additional escape of the exhaust gases takes place of from 20 to 30%, thus reducing the residual noxious gases in the cylinder.

In this eay a more perfect elimination of the burned gases is secured, as the gases coming out of the orifice 15 will not go out through the exhaust valve, so diminishing the turbulence and briction. The emptying of gasses at the end of the exhaust stroke is therefore more perfect reducing the back-pressure at the mainshaft bearing and other members.

The above mentioned orifice 15 may be unique or a number of them may be located at the same level and cooperating to perform the same function. One of them could be used for the admission and the other for the exhaust with appropriate valves. According to the type of engine, and the materials used, the orifice 15 should or should not be reinforced with a jacket, etc., the important point being that a communication with the outside must be established, as explained.

As one of the important conclusions, we should remark that according to practicale experiments the reduction in the fuel (gasoline) consumption is about 20 to 26%.

Also the orifice can be connected to a duct leading to a two-way valve system or the like, adapted to direct the exhaust gases either to the exhaust manifold or to cause the inlet of fresh air mass plus X as seen in FIGS. 8, 9 and 10.

From FIGS. 4, 5, 6 and 7, it is clearly illustrated graphically advantages secured with the present invention when it is applied to an engine.

In FIG. 8, the orifice 15 is located as in FIG. 1. However, orifice 5 communicates with a duct 20 which in turn leads to a fresh air inlet 21 or exhaust outlet 22 which is connected with the exhaust manifold (not shown).

A pivotal valve 23 is provided which is urged to a normally closed position (solid lines) by spring 24 which prevents intake of air from 21 unless the pressure in the cylinder is a predetermined amount smaller than atmospheric pressure. When the pressure in the cylinder is at its minimum corresponding to the lower dead point of piston movement at the end of the first stroke (180° in FIGS. 2 and 3) the pressure differential moves valve 23 from valve seat 25 to valve seat 26 whereby fresh air flows into the cylinder as desired.

When however, the piston is at the lower dead point at the end of the fourth (exhaust) stroke, the valve 23 is on seat 25 directing exhaust gases through outlet 22. A valve 27 is provided which permits exhaust flow through outlet 22 but prevents back flow into the cylinder because spring 28 maintains closure of valve 27 against such backflow.

In FIGS. 9 and 10 another valve system is shown for effect- the same flow result as described in connection with FIG. 8. A pivotal valve 30 is moved from seat 32 to 33 in response to negative pressure in the inlet 31 thereby directing air to impinge on spring balanced valve 34 (see FIG. 10) thereby causing flow of air into the cylinder via orifice 35. Conversely when exhaust pressure is greater than atmospheric the valve 34 is moved to the right (as seen in FIG. 9), and valve 30 is seated on seat 32 to direct exhaust gases to outlet 36. It should be noted that a linkage 37 connects values 30 and 34 whereby movement of the valve 34 to the right (FIG. 9) causes movement of valve 30 to seat 32 (for exhaust position) and whereby movement of valve 34 to the left shown in dotted lines causes movement of the valve 30 to seat on seat 33 (intake position).

The improvements described herein for 4-stroke engines exemplify improvements that could be introduced in all forms of internal combustion engines within the scope of this invention.

What is claimed is:

1. An improved four stroke internal combustion engine having a piston mounted for reciprocation in a cylinder, said piston having sealing rings thereabout its upper end, including exhaust and inlet valves at the upper end of said cylinder in combination with means for causing air to enter the cylinder at the end of the first stroke and for causing combustion gases to exhaust at the end of the third stroke, said means including an orifice through said cylinder spaced longitudinally from said valves located above the low dead point of the piston including check valves responsive to varying pressure differentials imposed on said orifice by piston movement wherein said check valves are mounted in a duct system having one duct in communication with said orifice and a second duct transverse to and communicating with the first said duct, the second said duct having an air intake port and a gas exhaust outlet, whereby said check valves are responsive to low pressure in the cylinder to cause only the intake of air into the orifice, and to high pressure in the cylinder to cause only the exhaust of gases from the orifice to the exhaust outlet wherein said valves include a normally closed pivotal valve in the second said duct and an axially reciprocating disc valve in the first said duct mechanically connected to said pivotal valve whereby both said valves open upon low pressure in the cylinder to cause air flow from the intake port into the orifice and only the second said valves opens upon high pressure in the cylinder to cause gas exhaust from the cylinder to the exhaust outlet including resilient means maintaining the said disc valve in a closed position.

* * * * *